J. REECE.
STOPPING AND STARTING MECHANISM.
APPLICATION FILED FEB. 6, 1917.

1,291,136.

Patented Jan. 14, 1919.
2 SHEETS—SHEET 1.

Inventor.
John Reece
by
Rogers, Kennedy & Campbell, Attys

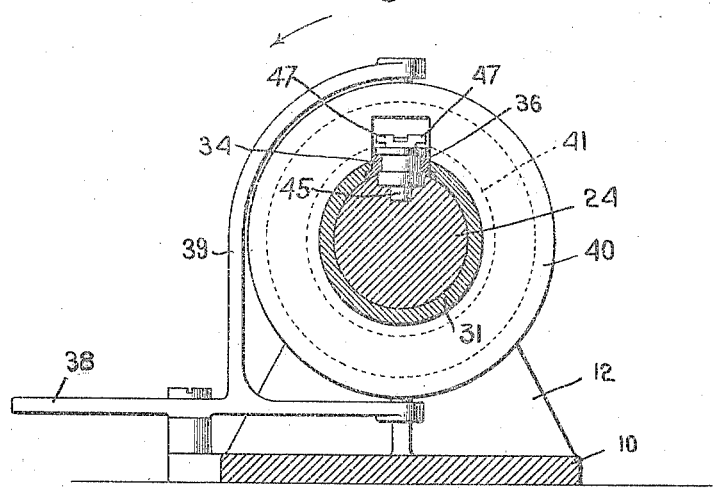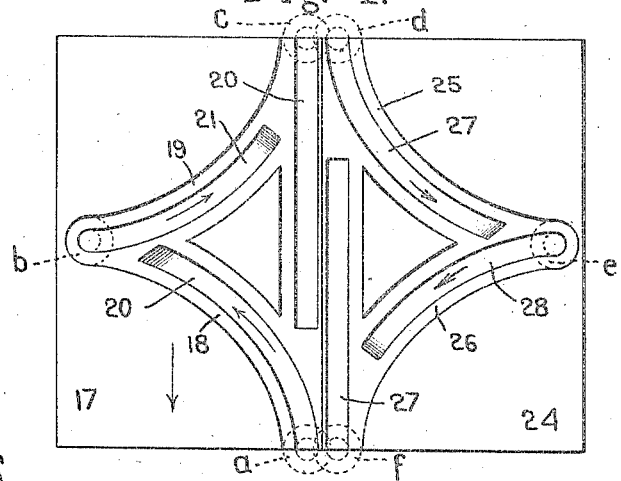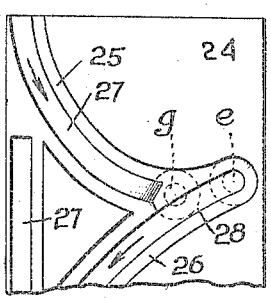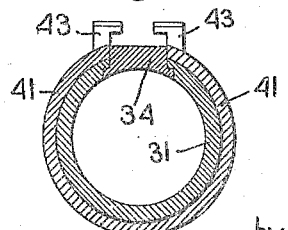

UNITED STATES PATENT OFFICE.

JOHN REECE, OF MANCHESTER, MASSACHUSETTS, ASSIGNOR TO THE REECE BUTTON HOLE MACHINE COMPANY, OF BOSTON, MASSACHUSETTS, A CORPORATION OF MAINE.

STOPPING OR STARTING MECHANISM.

1,291,136.     Specification of Letters Patent.     Patented Jan. 14, 1919.

Application filed February 6, 1917. Serial No. 146,923.

*To all whom it may concern:*

Be it known that I, JOHN REECE, a citizen of the United States, residing at Manchester, in the county of Essex and State of Massachusetts, have invented certain new and useful Improvements in Stopping or Starting Mechanism, of which the following is a specification, reference being had therein to the accompanying drawing.

This invention relates to stopping or starting mechanisms for various machines, such, for example, as power driven sewing machines. The principal object of the invention is to afford a mechanism whereby the machine shaft, which is usually termed the driven shaft, may at a suitable time be brought from its condition of working speed rotation through intermediate speeds to a stopped condition quickly and so as to give a definite final or stopped position, and yet without abrupt action or shock. A further object is to provide such a mechanism wherein the restarting of the machine is likewise effected easily, that is, without abruptness or shock, by a gradual speed change from zero to the working speed. Other objects and advantages of this invention will be set forth in the hereinafter following description or will be apparent to those skilled in the art.

To the attainment of such objects and advantages the present invention consists in the novel mechanism, and the novel combinations, arrangements, constructions and details herein shown or described.

Generally speaking, this invention presupposes a continuously moving driving member, which will usually be a belt driven shaft, and the present invention includes in combination with this a stationary member, and of course the driven member or shaft adapted to be rotated and stopped, together with a means for transmitting a rotating or stopping force to the driven shaft, this transmitting means being relatively shiftable in such way as to progressively change the operative relation between the driven member and the driving and stationary members, so as to cause a progressive speed decrease or increase between the working speed and zero.

I wish to make it clear that in many respects the mechanism to be herein described is reversible. For example, if the driving member be rendered stationary, the mechanism will still operate by permitting certain stationary parts to rotate; and various mechanisms or features pertaining to one or the other of the three members, driving, driven and stationary, may be relatively interchanged as between them without departing from the principles involved.

In the accompanying drawings forming a part hereof, Figure 1 is a plan view of a stopping or starting mechanism embodying the present invention, the illustrated mechanism being shown for convenience merely as one of many possible embodiments of the invention. In this and the other figures the parts are shown in the position they occupy when the driven shaft has been stopped.

Fig. 3 is a transverse cross-section on the plane 3—3 of Fig. 2.

Figure 1:
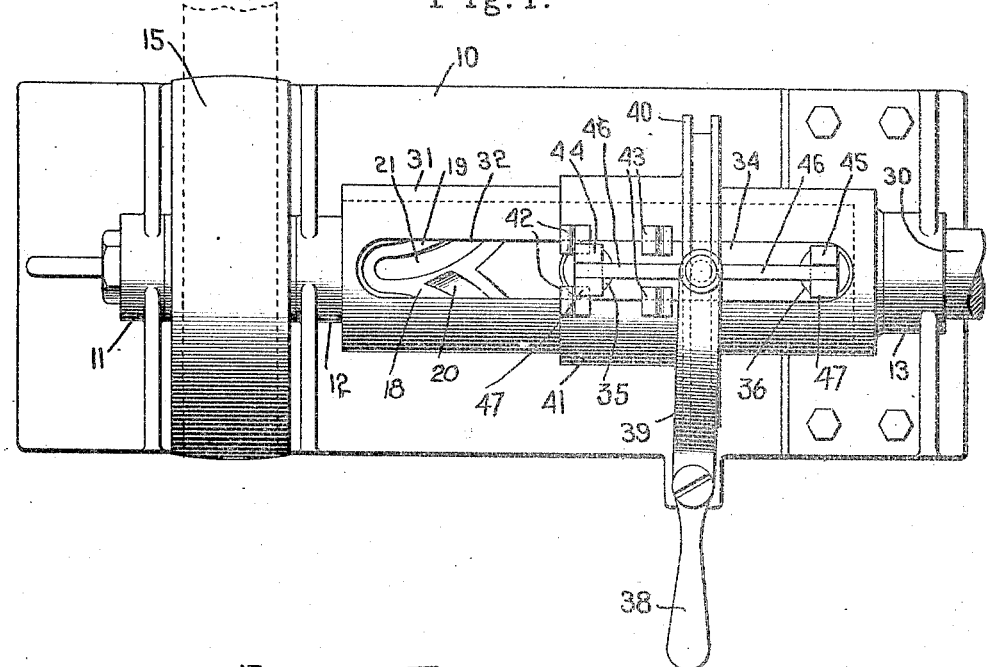

Fig. 4 in its left half shows a development of the cams or grooves, hereinafter to be described, provided in the driving member, and in its right half the cams or grooves of the stationary member of the mechanism. The cam surfaces are supposed to be severed along their lower sides, as shown in Figs. 1 and 2, so that the parts of the cams which are on top in these figures are at the vertical center in Fig. 4.

Figure 2:
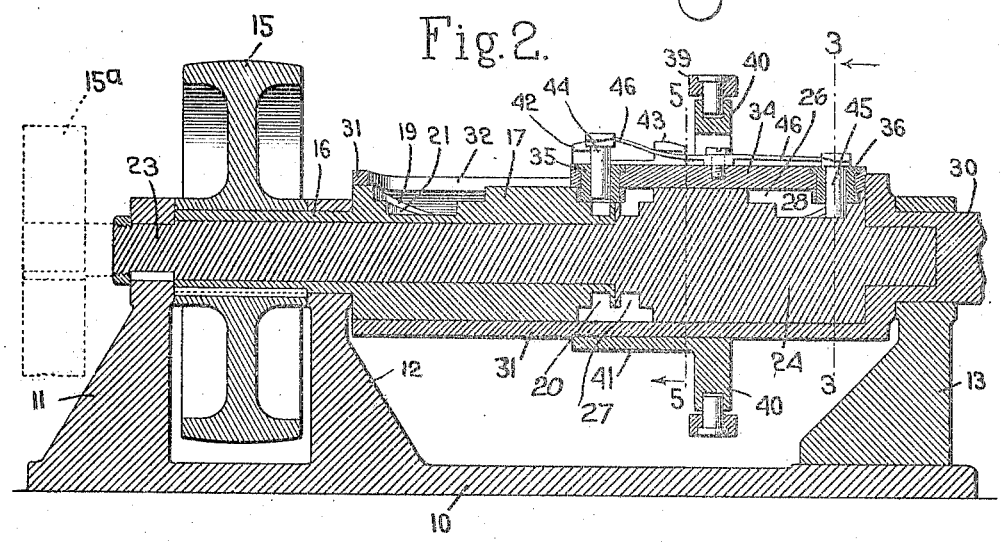
Fig. 2 is a central cross-section of the parts shown in Fig. 1.

Fig. 5 is a cross-section taken on the plane 5—5 of Fig. 2.

Fig. 6 is like a part of Fig. 4, showing a modification, wherein the stoppage is accompanied by a brief reversal.

A frame or base 10 is shown, which is provided with a series of brackets or supports, 11, 12 and 13, which afford bearings or support for the various elements of the system. The support 11 is shown as holding the left end of the non-rotating or stationary member. The support 12 is shown as affording a bearing for the rotation of the driving member. The support 13 is shown as affording a bearing for the driven member.

Referring now to the driving or continuously rotating parts of the system, these commence with the belt pulley 15, which is shown keyed to the main driving member, which is in the form of a sleeve 16. I may mention that, when the driving and stationary members are interchanged, the driving pulley may be provided on the latter, as indicated in dotted lines at 15<sup>a</sup>.

The main driving member or sleeve 16 is shown as enlarged at 17 at its right end for the purpose of providing certain rotating cams therein, whose operation and purpose will be later described. The cam grooves are shown developed in the left half of Fig. 4. There is a wide, shallow groove for the reception of a follower or roller, later to be described, and in the center of this groove, at certain parts of its length, is a narrow, deeper cam groove for engaging a certain control pin, later to be described. The first named cam groove comprises the portions 18 and 19, and the last named cam groove comprises the portions 20 and 21. This completes the enumeration of the continuously rotating driving parts.

Coming now to the stationary parts of the apparatus these comprise a main stationary member shown in the form of an interior axle or bar 23, which passes inside of the pulley 15 and the driving member 16, and is enlarged at 24 at its righthand end for the purpose of accommodating certain cams.

The cams which are provided in the stationary member 23 are analogous and may be similar to, though the reverse of those in the driving member 16. Thus, referring to the right half of Fig. 4, the wide, shallow cam groove has sections 25 and 26, while the narrower, deeper groove has sections 27 and 28. This completes an enumeration of all of the stationary parts of the illustrated apparatus.

In addition to the parts already described, are the driven parts of the mechanism and the transmitting means or elements, by which the driven parts are operatively connected with the driving or stationary parts, and lastly the control parts, by which the necessary adjustment or shifting is effected to give the functions and operation before described.

Coming now to the driven parts, which it is understood are those parts that vary in their rotation, being sometimes driven at full speed with the driving parts, and being sometimes brought to rest, these may include a driven shaft 30, shown at the right, which at its left end is enlarged or formed into the main driven member in the form of a hollow sleeve 31. The sleeve 31, as shown in Figs. 1 and 2, is provided with a guiding means or slot 32, which extends longitudinally and preferably parallel to the axis, and gives support to the transmitting element during the adjustment of the latter between operating and stopping adjustments.

Coming now to the transmitting means, this is shown as comprising a carrier 34, having followers or studs 35 and 36. The carrier is adapted to move longitudinally by its engagement in the slot 32 of the driven sleeve, and, this being so, the entire transmitting means rotates with or stops with the driven shaft.

The transmitting means, when shifted into one adjustment, is adapted to couple or lock together the driving and driven members, so that the driven shaft will rotate at the working speed, whereas in another adjustment it couples or locks together the driven and stationary members, so that the driven shaft is brought to and locked in a definite position in a condition of zero speed or no rotation. As will be explained, the construction of the parts is such that, as the transmitting element is shifted from one extreme position to the other, it compels the driven member to pass progressively through all speed conditions between working speed and zero, so that both stoppage and restarting are effected without abruptness, while, owing to the definite locked condition of the driven shaft when stopped, it invariably assumes the desired final position.

In order to better explain the relation between the driving, driven and stationary members, and the transmitting means, reference may be had to Fig. 4. In Figs. 1, 2 and 3, the machine is supposed to be stopped, and the follower stud 36 is operatively engaged and locked in the extreme righthand portion of the cam groove 25, as shown at *e* in Fig. 4. The enlargement 24, in which the cam groove is formed, being stationary, this holds the driven parts stationary. During this condition of affairs the driving parts are of course rotating at full speed, and therefore the cam stud or follower 35 is out of operative relation, and, indeed, is in such position, as indicated at *a* or *c*, or at any point between them, that the cams may rotate without effect on the stud by the active portions of the cam. On the other hand, when the driven shaft is rotating at working speed with the driving shaft, the follower stud 36 becomes inoperative by reason of its having been shifted to the left, so as to occupy the positions *d* or *f*, or any point between them, while the follower stud 35, as indicated, becomes locked in the extreme left apex of the cam 18, as indicated in *b* in Fig. 4. In other words, the shifting of the transmitting element from one extreme position to the other serves in effect to lock and unlock the driven parts to and from the driving or the stationary parts respectively.

The various cam groove portions 18, 19, 20, 21, 25, 26, 27, and 28 are all laid out on easy curves, as seen in Fig. 4, so that in the period of transition from one extreme condition to the other, there will be no abrupt change of motion, but, on the other hand, as will be later more fully explained, the driven shaft is compelled to pass progressively, that is gradually, from one extreme speed condition to the other.

We come now to the control of the stopping and starting adjustments. The determination of the length of time of the operation of the driven shaft before stoppage may be effected in any usual way, for example, by a creeping cam, or at will by hand lever, and for convenience I have shown the latter. The hand lever 38, which extends forwardly from its pivot, is provided with a rearwardly extending yoke 39, the pins of which engage a grooved collar 40, formed rigidly with a sleeve 41, surrounding and rotating with the driven sleeve 31. The sleeve 41 is recessed, as shown in Fig. 3, to accommodate the longitudinally sliding carrier 34, which therefore serves to hold the two sleeves in proper relation while permitting the exterior sleeve 41 to be adjusted longitudinally by the handle 38.

The control of the movement of the follower studs 35 and 36 is effected through the pins 44 and 45, previously mentioned, each of which is adapted to be dropped into engagement with the deep, narrow cam groove 20, 21, 27 or 28, or to be lifted therefrom, or held thereabove, to render it inoperative. Fig. 2 shows the pin 44 in its lifted inoperative position, while the pin 45 is in its depressed operative position, engaging groove 28, as also seen at e, Fig. 4.

The external or control sleeve 41 contains a suitable locking device in the form of a pair of lugs 42, 42, for holding the pin 44 elevated and inoperative, and similarly the sleeve carries another pair of lugs 43, 43, for rendering the pin 45 inoperative. A spring 46, 46, is shown tending to depress the pins 44, 45.

As the parts are shown in Figs. 1 and 2, the pin 44, through its laterally extending flanges 47, is held and locked in its upward position by the lugs 42, while the pin 45, not being so locked, is in operative engagement with the cam groove 28.

It should be explained that the deep cam grooves 20, 21, 27, 38 and the pins 44, 45 that are made to engage them to initiate the starting or stopping action, are supplemented or auxiliary to the shallow grooves 18, 19, 25, 26 and the studs 35, 36. The control means puts the pins into action, and the shifting which is thus begun is taken up and performed by the studs, the pins, when through with their function, being thrust upward out of the deep grooves by the slanted or curved terminations of the grooves as indicated by the shaded portions or rises shown in Fig. 4. The lugs 42 or 43 subsequently lift the pins completely out of contact, as already explained. Also, the lugs 42, 43 are thin and so constructed that the flanged sides of the pins, after being allowed to drop, may travel to left or right beneath the lugs.

As the parts are shown in stopped position, I will first describe the operation in restarting the machine. By throwing the handle 38 to the right, the control sleeve 41 is shifted to the left. This carries the supporting or locking lugs from beneath the lateral flanges of the pin 44, so that the pin is permitted to drop. This may occur at any point in the rotation of the driving member, that is, at any point between a and c in Fig. 4. The pin will drop into and engage the cam groove 20 as soon as permitted by the rotation of the driving parts. This cam groove, it will be observed, consists partly of a dwell or annular portion, followered by a curved section, which tends to throw the pin to the left. As the pin 45 travels leftward through the slanted or curved portion of the cam 20, it carries leftward with it the entire system of transmitting parts, including the follower stud 35, the carrier 34, the follower stud 36, and the pin 45 associated with the latter.

During this shifting stage of the operation, we therefore have the pin 44 and stud 35 traveling in the cam grooves, 20 and 18, while at the same time the pin 45 and stud 36 are engagaged in and compelled to travel along the cam grooves 28 and 26. It being understood that the carrier 34 and both studs and pins are carried with the driven parts of the apparatus, and that the enlargement 24, in which the cams 28 and 26 are formed, is stationary, it will be seen that the driven shaft is compelled to rotate, and in the direction of rotation of the driving shaft. This rotation commences very gradually, because of the very easy slant at the beginning of the cam 20, and additionally because of the easy slant at the beginning of the cam 28. The rotation, however, is rapidly accelerated, first, because the rate of throw of the cams 18 and 20 to the left increases rapidly, thus causing the carrier and studs to accelerate in their leftward movement, and additionally because the reaction between the stationary cams 26 and 28 and the driven shaft is accelerated, owing to the increasing declivity of the cams 26 and 28.

The termination of this transition from stopped condition to working rotation of the driven shaft is that the stud 35 passes to the point b, where it is effectively locked and causes the driving and driven parts to rotate in unison, whereas the stud 36 has passed beyond the operative portions of the cams 26 and 28, and rotates idly. During the final portion of this shifting movement, the lateral flanges at the top of the pin 45 pass over the lugs 43 of the control sleeve 41, and the pin is thereby slightly lifted entirely out of contact with the stationary parts beneath. The mechanism is now in full working condition.

The operation in stopping the machine is substantially analogous to, but the reverse, of the starting just described. The handle 38 is thrown to the left, which throws the sleeve 41 to the right, and thus removes the lugs 43 from beneath the flanges of the pin 45, permitting the latter to drop into engagement with the annular or dwell portion of the cam 27. This cam in its curved portion serves to bodily shift the carrier and studs and pins to the right, so that the stud 35 and pin 44 are forced to the right along the cams 19 and 21. The curvature of the cams 25 and 27 causes an acceleration in the rightward movement of the parts, the tendency of which is to retard the rotation of the driven shaft by effectively forcing it reversely with respect to the driving shaft. This retarding effect upon the driven shaft is enhanced by the curvature of the cams 19 and 21, which operate with progressively increasing effect to thrust the driven shaft relatively backward until, at the conclusion of this stopping operation, the driven shaft has been forced into a substantially zero speed, it, in other words, coming to rest, and being there locked by the engagement of the stud 36 in the apex of the cam 25, as shown at $e$. Thus, the initial conditions are restored.

In the Fig. 6 modification, the curvature of the stationary stopping cam grooves 25, 27, is altered, so as to dip or bow to a position $g$ beyond the final position $e$, thus causing the driven shaft to slightly overrun, and then return to the final stopped position, an operation sometimes desirable in sewing or other machines.

It will thus be seen that I have described a stopping or starting mechanism embodying the principles and attaining the objects and advantages hereinbefore recited. Many matters of arrangement, combination, detail and other features may be varied without departing from the main principles involved, and it is therefore not intended to limit the invention to such features except in so far as specified in the appended claims.

What is claimed is:

1. In a stopping or starting mechanism, the combination of a continuously rotating driving member, a stationary member, a driven member adapted to be rotated and stopped, and a transmitting means axially shiftable to progressively change the operative relation between the driven member and the other members to cause a progressive speed change between working speed and zero, said transmitting means during its shifting having operative engagement with all three of said members.

2. In a stopping or starting mechanism, the combination of a continuously rotating driving member, a stationary member, a driven member adapted to be rotated and stopped, and a transmitting means axially shiftable to progressively change the operative relation between the driven member and the other members to cause a progressive speed change between working speed and zero, said transmitting means during its shifting having operative engagement with all three of said members, but becoming inoperative with relation to one or the other of the driving or stationary members at the finish of its shifting movement.

3. In a stopping or starting mechanism, the combination of a continuously rotating driving member, a stationary member, a driven member adapted to be rotated and stopped, a transmitting means axially shiftable to progressively change the operative relation between the driven member and the other members to cause a progressive speed change between working speed and zero, and means for locking the driven member to the driving or stationary members in the extreme positions of the transmitter.

4. In a stopping mechanism, the combination of a continuously rotating driving member, a stationary member, a driven member adapted to be rotated and stopped, and a transmitting means axially shiftable while engaging both the driving and stationary members to progressively change the operative relation between the driven member and the other members and thereby to cause positive drive at progressively reducing speed from working speed to zero.

5. In a stopping mechanism, the combination of a continuously rotating driving member, a stationary member, a driven member adapted to be rotated and stopped, a transmitting means axially shiftable while engaging both the driving and stationary members to progressively change the operative relation between the driven member and the other members and thereby to cause positive drive at progressively reducing speed from working speed to zero, and means for holding the driven member in a predetermined stopped position at the termination of the action of said transmitting means.

6. In a stopping mechanism, the combination of a continuously rotating driving member, a stationary member, a driven member adapted to be rotated and stopped, and a transmitting means relatively shiftable while engaging both the driving and stationary members to progressively change the operative relation between the driven member and the other members and thereby to cause positive drive at a progressively reducing speed from working speed to zero, said transmitting means being arranged to cause the decreasing forward drive to continue to a predetermined forward stopping position and to then cause a predetermined extent of reverse drive to the final stopping position.

7. In a stopping or starting mechanism, the combination of a continuously rotating driving member and a cam rotating therewith, a stationary cam, a driven member adapted to be rotated and stopped, and cam following means rotating and stopping with the driven member arranged to engage the rotating cam and the stationary cam, and to shift axially whereby to cause the driven member to pass progressively through speed changes between working speed and zero.

8. In a stopping or starting mechanism, the combination of driving, driven and stationary members, a cam device between one pair of such members, a second cam device between another pair of such members, and axially shifting means for controlling both cam devices, whereby the driven member is caused to be driven progressively at increasing or decreasing speed between the working speed of the driving member and zero.

9. In a stopping or starting mechanism, the combination of a continuously rotating driving member, a stationary member, a driven member adapted to be rotated and stopped, and a transmitting means axially shiftable while engaging both the driving and driven members to cause a definite predetermined progressive change in the operative relation between the driven member and the other members to cause positive drive at a progressively decreasing speed between working speed and zero.

10. In a stopping or starting mechanism, the combination of a continuously rotating driving member, a stationary member, a driven member adapted to be rotated and stopped, a transmitting means axially shiftable to progressively change the operative relation between the driven member and the other members to cause a progressive speed change between working speed and zero, and means for locking the driven member to the driving or stationary members in the extreme positions of the transmitter and for operatively disengaging it from the member other than that to which it is locked.

11. In a stopping mechanism, the combination of a continuously rotating driving member, a stationary member, a driven member adapted to be rotated and stopped, and a transmitting means axially shiftable while engaging all three of said members to progressively change the operative relation between the driven member and the other members to cause a progressive speed reduction from working speed to zero, the drive being continued in decreasing extent substantially to the stop point.

12. In a stopping mechanism, the combination of a continuously rotating driving member, a stationary member, a driven member adapted to be rotated and stopped, and a transmitting means relatively shiftable while engaging all three of said members to progressively change the operative relation between the driven member and the other members to cause a progressive speed reduction from working speed to zero, said transmitting means being arranged to cause the decreasing forward drive to continue to a predetermined forward stopping position and to then cause a predetermined extent of reverse drive to the final stopping position, by the mere further shifting of the transmitting means.

13. In a stopping or starting mechanism, the combination of a continuously rotating driving member and a cam rotating therewith, a stationary cam, a driven member adapted to be rotated and stopped, and cam following means carried by the driven member arranged to engage the rotating cam and the stationary cam, and to shift axially whereby to cause the driven member to pass progressively through speed changes between working speed and zero.

14. In combination, a stationary machine member, a rotatable driving member, a driven member adapted to be rotated and stopped while the driving member continues rotating, and an axially shiftable transmitter connected to rotate and stop with the driven member, a cam device on the driving member operatively engaging the transmitter for full speed drive, a cam device on the stationary member operatively engaging the transmitter for preventing drive, and said cams arranged to both engage the transmitter as it shifts whereby the driven member is positively driven at progressively changing speed during stopping or starting.

15. In combination, a rotatable driving member carrying a cam, a driven member adapted to be rotated and stopped while the driving member continues rotating, a non-rotating cam, and an axially shiftable transmitter so coördinated with the two cams and driven member that as the transmitter shifts the driven member is positively driven at a progressively changing rate.

16. In combination, a rotatable driving member, a driven member adapted to be rotated and stopped while the driving member continues rotating, an axially shiftable transmitter connected to rotate and stop with the driven member, a device on the driving member coöperating with the transmitter, and a non-rotating device coöperating with the transmitter, the parts so correlated that the driven member is positively driven at a progressively changing rate between full speed and zero when stopping or starting.

In testimony whereof, I have affixed my signature hereto.

JOHN REECE.